UNITED STATES PATENT OFFICE 2,646,384

THERAPEUTIC WATER-SOLUBLE CHLOROPHYLL-CONTAINING FEED

Morris L. Rakieten, Islip, N. Y., assignor to Rystan Company, Inc., Mount Vernon, N. Y., a corporation of New York No Drawing. Application August 3, 1950, Serial No. 177,571

7 Claims. (Cl. 167—53.1)

This invention relates to an improved poultry feed which has proved particularly valuable for feeding young ducks and combating "New Duck Disease."

During the past few years a disease in growing ducks has taken a heavy toll. The disease, supposedly due to a species of bacteria known as a Pasteurella, attacks the liver, spleen and most likely other tissues. The etiological agent was isolated by Hilbert et al. in 1931, but since that time this organism has not apparently been isolated from ducks dying or dead from the so-called "New Duck Disease." Diagnoses have been made largely on gross pathological examination of tissues. Ducks ill with this disease show symptoms of gastro-intestinal inflammation and are sick a day or two before they succumb.

The disease appears generally in ducks that are over three weeks old and is present in ducks as old as six weeks. Mortality figures have run as high as 80% in a single flock. Sulfamethazine has been used, apparently with some success, for controlling the disease and markedly reducing the mortality. More recently sulfaquinoxyline has been used to replace the sulfamethazine. These sulfa compounds have been added to the stock feed and ducks were fed with this "fortified" feed every other day for three days. This medicated feed is not used until the disease has actually taken place. A checking of the infection follows the use of this feed but there is always substantial mortality even when such sulfa feed is used, e. g., a mortality of around 4%.

The improved poultry feed of the present invention has shown surprising and unexpected results in the prevention and control of this new duck disease, enabling the loss of young ducks to be reduced to e. g., around 1% or less.

The improved poultry feed of the present invention is made by incorporating in the poultry feed a small amount of water-soluble chlorophyll, amounting, e. g., to around 1 pound of water-soluble chlorophyll for each 5 to 10 tons of poultry feed. The water-soluble chlorophyll is used in a finely divided form and is thoroughly mixed with the other ingredients of the poultry feed and is then pelleted so that each pellet will contain its proportion of the water-soluble chlorophyll.

The proportion of water-soluble chlorophyll can be varied and somewhat larger amounts used as well as smaller amounts but the proportion of 1 part in 10,000 has been found particularly effective in combating the New Duck Disease. The water-soluble chlorophyll used is advantageously a highly concentrated product, largely freed from the accompanying impurities associated with the cruder forms of chlorophyll. Such water-soluble chlorophyll is advantageously in the form of sodium copper chlorophyllin.

A poultry feed of the type used for growing ducks and with which the water-soluble chlorophyll is advantageously combined is a feed such as sold as a "duck grower feed" with a guaranteed analysis of not less than 17½% protein, not less than 3% fat and not more than 7% fibre and with the ingredients as follows:

Meat scrap
Fish meal
Animal protein factor supplement
Soybean oil meal
Dehydrated alfalfa leaf meal
Wheat bran
Wheat flour middlings
Wheat red dog
Pulverized oats
Ground barley
Corn meal
Riboflavin supplement
Vitamin A and D feeding oil
D-activated animal sterol
Calcium phosphate
Calcium carbonate
Iodized salt
Anhydrous manganese sulphate The water-soluble chlorophyll is incorporated in such a poultry feed while it is in a finely divided state and by thorough admixture of the finely divided chlorophyll powder to insure thorough and uniform distribution and then pelleting the resulting composition, the water-soluble chlorophyll being used in the proportion of about 1 pound for each 5 tons of poultry feed.

As illustrating the use and advantages of the new poultry feed, it was used during the spring months on a duck farm where trouble with the New Duck Disease was being experienced. The pattern of infection over a period of several weeks was much the same. Ducks approximately three weeks and four days old would come down with the New Duck Disease. The common practice was to start the use of the sulfa feed as soon as the disease appeared and make this feed available to the ducks every other day for three days. The mortality figures varied from 4 to 7%. Untreated controls would average approximately 12% to 15% deaths. In the hatch prior to the use of the new poultry feed there were 2640 ducks and the disease appeared four weeks and three days after hatching. The sulfa feed was made available for three days, giving it every other day. The mortality was 109 ducks.

The next hatch at the same farm comprised 2760 ducks. Of these, 800 birds were segregated and given the new chlorophyll-containing feed for four days, beginning three weeks and two days after hatching. The disease broke out four days later. The sulfa feed was given to all of the other birds, 1960 in number. Of the 1960 birds given the sulfa feed there were 77 deaths or 3.9%. Of the 800 birds given the chlorophyll-containing feed there were 8 deaths or 1%.

The next hatch treated comprised 2823 birds. Five days before the expected break with the New Duck Disease all of the birds were allowed to feed on the chlorophyll-containing feed and no sulfa feed was given to any of these birds. Of the 2823 ducks so fed there were 11 deaths from New Duck Disease or 0.39%.

The next hatch of birds comprised 2926 birds. No chlorophyll feed was used but the sulfa feed was used, beginning as soon as the disease appeared, four weeks and three days after hatching. Of the 2926 birds so fed there were 121 deaths, or 4.1%.

I claim:

1. Duck feed in pellet form containing intimately distributed throughout the feed a small amount of water-soluble chlorophyll in the proportions of about 1 pound of water-soluble chlorophyll for each 5 to 10 tons of feed.

2. Duck feed comprising edible matter in a finely divided state and a minor proportion of water-soluble chlorophyll substantially uniformly distributed therethrough.

3. Duck feed as specified in claim 2 wherein the proportion of chlorophyll to edible matter is about 1 to 10,000.

4. Duck feed as specified in claim 2 wherein the proportion of chlorophyll to edible matter is from about 1 to 10,000 to about 1 to 20,000.

5. Duck feed as specified in claim 2 which contains edible vegetable matter.

6. Duck feed as specified in claim 2 which contains edible protein matter.

7. Duck feed as specified in claim 2 which contains alfalfa meal.

MORRIS L. RAKIETEN.

References Cited in the file of this patent

UNITED STATES PATENTS

| Number | Name | Date |
|---|---|---|
| 2,069,388 | Peebles | Feb. 2, 1937 |
| 2,168,532 | McMath | Aug. 8, 1939 |

OTHER REFERENCES

Drug and Cosmetic Industry, volume 54, April 1944, pages 393 and 394.

Farmer's Bulletin Number 1652, U. S. Department of Agriculture, revised March 1949, pages 10 and 11.

Lesser Drug and Cosmetic Industry, volume 55, July 1944, pages 38, 39, 111 to 114.

Serling, Veterinary Medicine, July 1950, pages 291, 292.